J. G. Holmes,
Commode,
Nº 64,673. Patented May 14, 1867.
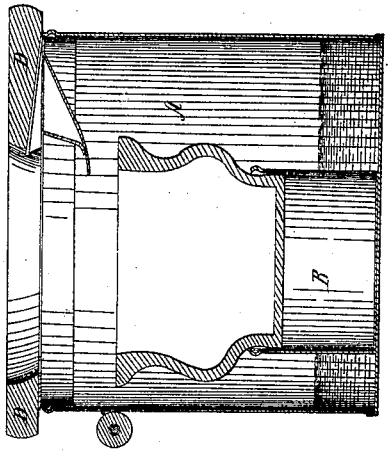
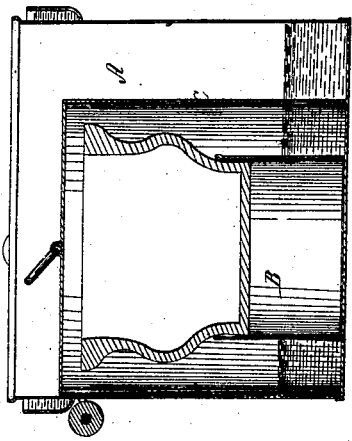
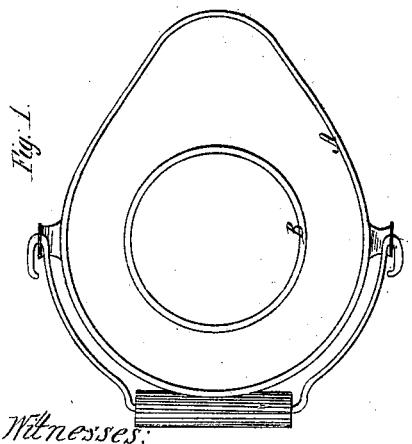
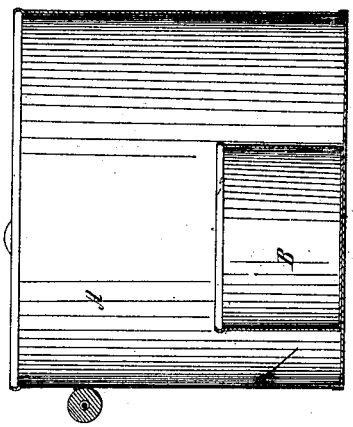
Witnesses;
Inventor;

United States Patent Office.

JAMES G. HOLMES, OF CHARLESTON, SOUTH CAROLINA.

Letters Patent No. 64,673, dated May 14, 1867.

IMPROVEMENT IN PORTABLE WATER-CLOSETS, OR ANOSMIA.

The Schedule referred to in these Letters Patent and making part of the same.

TO ALL WHOM IT MAY CONCERN:

Be it known that I, JAMES G. HOLMES, native resident of the city of Charleston, in the State of South Carolina, have invented a new and improved mode of preventing the escape of gas from a portable commode or water-closet, which invention, from the Greek "*an*," *without*, "*osmia*," *smell*, or "*anosmos*," *inodorous*, I have called Anosmia; and I do hereby declare that the following is a full and exact description thereof, reference being had to the accompanying drawings, and to the letters of reference marked thereon, in which—

Figure 1 represents a plan or top view of the bucket.

Figure 2, a central vertical section of the same.

Figure 3, a central vertical section with cover in position and chamber in place; and Figure 4, a similar section exhibiting the inner bucket or cover.

The nature of my invention consists in providing a bucket or other water-tight vessel, A, of suitable form and size to hold on the bottom or on a suitable stand, B, within the bucket, an ordinary chamber-pot or any other vessel designed to receive the urine and fæces of a person using it, and after removing a cover or seat, D, arranged for convenience in the manner shown in the drawings, then to cover up the vessel containing the urine and fæces by means of a bucket, C, fig. 4, of metal or any other suitable material, so that the open end of such cover shall be immersed in water or other fluid placed within the bucket which contains the pot. For convenience a handle is attached to the outside bucket, as in ordinary slop or other movable buckets.

I am aware that a water-packing has been before used in vessels of this description by means of a groove or trough around the upper portion of the vessel, which, after being filled with water, is intended to receive a flange which is attached to the cover. But this trough being attached to the vessel is liable to become polluted with the fæces, and is, besides, from its position and shallowness of depth, very liable to be spilled unless the vessel is moved with great caution. Both these objections, and especially the latter, are wholly obviated by the arrangement proposed by me.

What, therefore, I claim as my invention, and desire to secure by Letters Patent, is—

1. In a portable water-closet, constructed substantially as described, I claim the use of an exterior upright vessel, and of an interior inverted vessel so arranged as to prevent the escape of any fetid odor by means of a water-packing extending to the lower portion of the exterior vessel, substantially as described.

2. I claim, as a new article of manufacture, a portable water-closet which is rendered inodorous by means of a closed inverted vessel, with its water-packing which extends to or below the bottom of the vessel which is to contain the fæces, substantially as and for the purpose described.

3. In a portable water-closet, I claim the rendering of the same effective by means of an external vessel, an internal inverted vessel packed with water, while the vessel to receive the fæces is separate and distinct from either of the others, substantially as described.

JAMES G. HOLMES.

Witnesses:
J. H. PHILLIPS,
GEO. C. LAMBRIGHT.